Dec. 20, 1960  W. C. RICH, JR  2,965,196
APPARATUS AND METHOD FOR HAZARDOUS VAPOR
REMOVAL IN THE REFUELING OF AIRCRAFT
Filed April 11, 1958
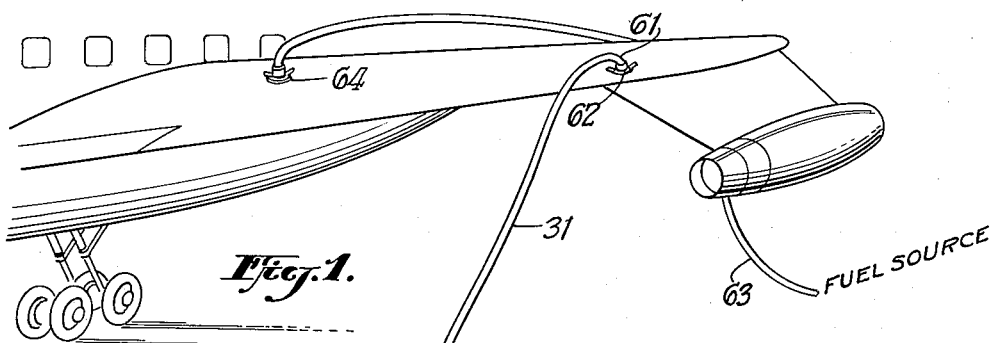
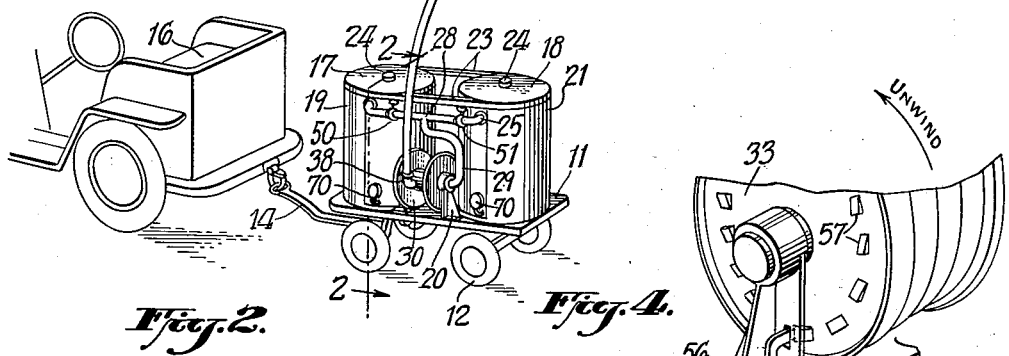
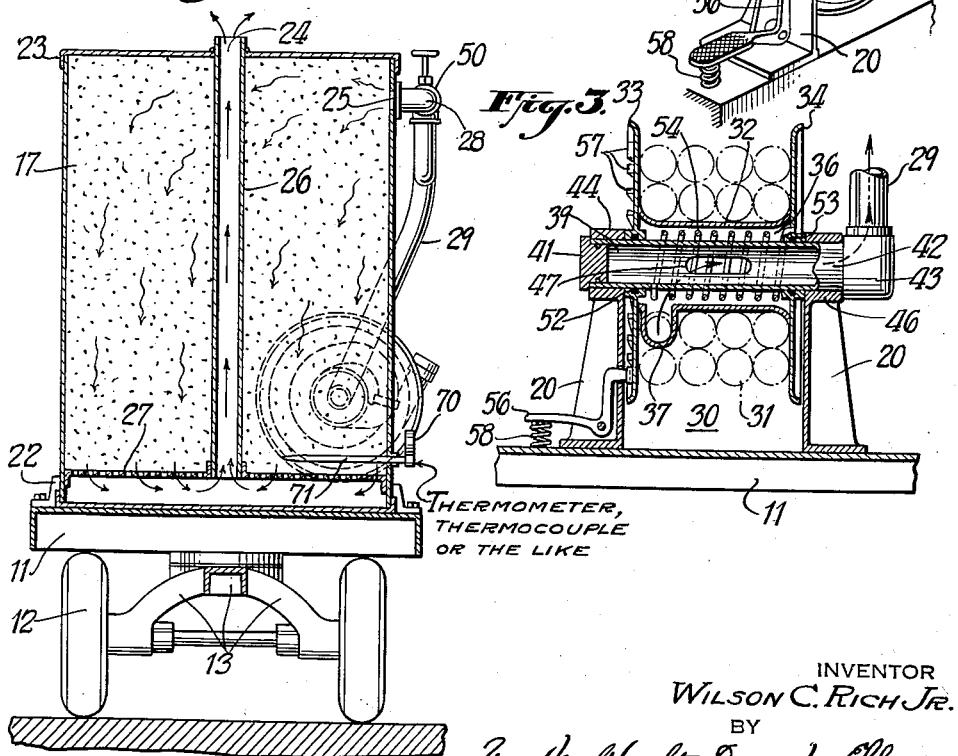
INVENTOR
WILSON C. RICH JR.
BY
Ward Neal Haselton Orme McChannon
ATTORNEYS

United States Patent Office 2,965,196
Patented Dec. 20, 1960

2,965,196

APPARATUS AND METHOD FOR HAZARDOUS VAPOR REMOVAL IN THE REFUELING OF AIRCRAFT

Wilson C. Rich, Jr., 19 Highland Ave., Fair Haven, N.J.

Filed Apr. 11, 1958, Ser. No. 727,952

3 Claims. (Cl. 183—4.4)

This invention relates to the refueling of aircraft, and particularly to a method for removing and rendering harmless in the immediate vicinity of the aircraft the hazardous vapor-laden air which issues from the fuel tank vents during filling of the tanks. In another aspect the invention relates to portable apparatus for collecting the dangerous vented vapors, containing them, thereby greatly reducing health and fire hazards and releasing vapor-free air at the refueling sites.

With the advent of commercial jet airliners, airport facilities are being modernized and enlarged, the current installation of new facilities at New York International Airport being an example of these recent changes. At such airports, it is proposed to provide roof means extending from the passenger waiting rooms out to the entrance of the planes and thus more or less covering the loading areas and possibly portions of the planes. The fuel capacity of the newest jet planes is comparatively large, and in order to conserve ground time and handle transient aircraft more efficiently many airfields are proposing to use underground fuel delivery systems which enable refueling from hydrants immediately adjacent the passenger waiting rooms and boarding areas and while the passengers are embarking.

While transient propeller driven aircraft are often fueled at the boarding zone, the passengers are generally under a separate roof removed from the aircraft and generally not permitted to approach the plane during refueling so as to reduce the hazards of fire, annoyance, and possible sickness due to breathing gasoline vapors, and under those conditions, "propeller wash" dispersion of the vapor is effective and satisfactory. Also, the fuel capacity of present commercial propeller driven aircraft is relatively small compared with the special fuel burning jet liners now making their appearance. For example, one typical plane of such class has a capacity of 20,000 gallons, or two railroad tank cars of fuel, and facilities are being constructed for filling the fuel tanks of such planes within about 20 minutes or at the rate of 1,000 to 1,200 gallons per minute, directly from fuel hydrants located at the loading stations. The facilities at one airport, for example, are being designed to fuel thirty-seven of such aircraft simultaneously. Thus large volumes of explosive vapor-laden gases have to be displaced from the plane fuel tanks within a short time interval, as the tanks become rapidly filled with fuel.

In view of the fact that 20,000 U.S. gallons represents a volume of 2,674 cubic feet, it can be seen that both safety and odor hazards will exist not only to passengers but also to maintenance personnel at the loading stations while the refueling is being carried out. While gasoline vapors are usually too rich to constitute a troublesome explosive hazard, yet jet fuel, for example JP-4, releases vapors which are explosive over a wide mixture range at atmospheric temperatures and pressures. Being heavier than air, JP-4 vapors will cling along the ground, especially on calm days and may easily surround or flow into the passenger loading areas and waiting rooms.

Methods suggested for dispersing such vapor include overhead blowers and fans which, however, have not satisfied the airport authorities or fire underwriters.

In accordance with the present invention, portable apparatus is provided for collecting and disposing of all of the vapors issuing from the airplane tank vents, immediately adjacent the aircraft, without resort to blowers and indeed preferably without any moving parts.

In the drawings, Figure 1 is a perspective view of the apparatus of the present invention in use; Figure 2 is a vertical sectional view taken on the line 2—2 of Fig. 1, and Fig. 3 is a sectional elevation of a hose reel and storage means which may be used in accordance with the invention, and Fig. 4 is a partial perspective view of a portion of the reel illustrating a preferred form of rotation control.

Referring now to the drawings in further detail and particularly to Figs. 1 and 2, the present apparatus comprises a portable supporting base member 11 provided with wheels 12, conventional front axle assembly shown generally at 13, and a tongue 14 for connection to a battery powered vehicle or other towing means indicated at 16. In a preferred embodiment the portable base or cart 11 is adapted to receive a pair of cylindrical adsorber vessels 17 and 18. Upright supports as at 19 secured to the base member as at 22, and joined near their adjacent upper ends by lateral support members 23 secure vessels 17 and 18 on the base in the position indicated in Fig. 1.

Each of the adsorber vessels has a vapor inlet opening 25 in the side near one of its ends, or in one end and an exhaust opening 24 preferably centrally disposed in the same end. The vessels are provided with an interior tubular or baffle member 26 secured at the exhaust opening as by welding and extending through the vessel to a point just removed from the opposed end or base as illustrated in Fig. 2 where it is secured to a lateral member 27. The member 27 may if desired constitute a false bottom of the absorber vessel in which instance it is perforated as indicated in Fig. 2 to permit the unobstructed free flow of gas from the space above into the tubular exhaust member 26.

The vessels 17 and 18 are filled with a finely divided adsorbent material such as activated carbon, capable of retaining, i.e. adsorbing, the hydrocarbon fuel vapors which are introduced thereinto. The preferred adsorbent is 6 to 14 mesh activated carbon, with a surface area of about 1,000 sq. meters per gram, which is commercially available.

The respective inlet openings 25 in the adsorber vessels are joined by an inlet manifold 28, which communicates with a centrally disposed inlet pipe 29. As shown in Fig. 1 the inlet pipe 29 communicates with a flexible hose 31 through a reel indicated generally at 30, which is secured as by members 20 to the portable base 11. The purpose of the reel 30 is of course to pay out and store the flexible hose 31.

Referring now to Fig. 3 the reel comprises a hollow spool 32 with flanged ends 33 and 34. The hollow central portion of the spool is adapted as at 37 for coupling with the end 38 of hose 31. Spool 32 is rotatably coaxially mounted on a hollow shaft 39 which is closed at one end 41, the other end 42 comunicating as at 43 with inlet pipe 29. The hollow shaft 39 is rigidly secured as at 44 and 46 to supporting members 20. One or more passageways 47 are provided in the wall of shaft 39 which permit the flow of vapor-laden air from space 36 between spool 32 and the exterior of the shaft into the hollow shaft, and into upright inlet tube 29, thence to manifold 28, and depending upon the condition of valves 50 and 51 therein, into one or the other of the adsorber vessels 17 and 18. Suitable sealing rings 52 and 53 in the ends of spool 32 where they contact shaft 39 prevent vapor leakage from space 36.

While the flexible hose 31 may be wound onto reel 30 by manually turning or cranking spool 32, coil spring means 54 are preferably provided in the space 36 intermediate the spool and the exterior wall of shaft 39, with one end of the spring secured to the spool and the other end to the shaft. Thus as hose 31 is withdrawn from the spool, the spool rotates and spring 54 is tensioned, and this tends to rotate the spool in the opposite direction when tension on the hose is released thereby facilitating rewinding.

A ratchet assembly generally indicated at 56 in Figs. 3 and 4 is preferably provided as a locking device for the spool. Tapered protruding stops 57 are provided on one side of the spool for engagement with ratchet 56. The stops are tapered as indicated in Fig. 3 so that the spool may be unwound and the hose paid out without adjusting ratchet 56, the engaging portion thereof simply riding up the tapered or inclined surfaces of the stops. When the desired length of hose has been withdrawn from the spool the spring 54 causes the spool to wind up until the ratchet contacts the upright normal surface of one of the stops 57. The hose may be retracted or wound up as desired simply by depressing spring 58 and disengaging the ratchet.

While the apparatus has thus far been described as embodying two adsorber vessels, it is also to be understood that a single vessel on a portable base is within the scope of the present invention. At least two adsorber vessels are preferred, however, since one may become saturated with hydrocarbon vapor during a refueling operation in which case one of the manifold valves will be closed and the other opened, thus directing the vapor into a bed of fresh adsorbent in the other vessel. It is to be understood that the present invention involves a portable apparatus for rendering harmless the dangerous hydrocarbon vapors issuing from the vent of a fuel tank being filled, and not to any particular number of adsorber vessels. Furthermore, while the apparatus has been described as having an interior tubular member 26 to assure passage of vapor through the entire bed, it is within the scope of the present invention to simply provide an inlet at one end and an outlet at the other end of the bed.

The construction of the adsorber vessels is preferably substantially as illustrated in Fig. 2. That is to say, the vapor-laden air makes only a single pass through the bed of solid adsorbent which is at least of sufficient volume to adsorb the vapors vented in the refueling of a number of aircraft. It is of course within the scope of the invention to baffle the interior of the vessel so as to require two or more passes over the length of the bed. However, a single pass is preferred so as not to create any appreciable resistance to the flow of vapors through the system.

In the apparatus illustrated in the drawings, the adsorber vessels are approximately three and one-half feet in diameter and four feet high and each contains approximately 1,000 pounds of activated carbon. In a bed of these dimensions the rate of vapor flow may vary from about 2 to 10 feet per minute depending on what type of aircraft is being refueled and at what rate. The preferred maximum rate is about 8 feet per minute to assure a low pressure drop even when fueling at the maximum rate. As the fuel is rapidly admitted to the tanks of the plane, this, of course, will tend to cause the hazardous vapor-laden air to be forced out of the tank vents in volumes equivalent to the volumes of fuel being admitted. However, because of the resistance to the flow of gas through the activated carbon beds connected by the hose to the tank vents, some pressure will be built up in the gas space above the fuel in the tanks until this pressure is just sufficient to force the total flow of vapors through the carbon beds and attendant equipment. Generally, this pressure build-up will be equivalent to about two inches of water pressure per square inch or less. That is, the resistance to gas flow offered by the adsorber bed will automatically control the pressure build-up in the wing fuel tanks so that the rate of flow of the gases from the fuel tanks will be the same volumetric quantity as the incoming fuel, without requiring any control valves or moving parts such as blowers or vents. The flow will thus automatically stabilize itself at a rate slow enough to insure thorough adsorption of the hazardous vapors and thus separation of same from the air before the air escapes from the vessel outlets as at 24.

As the vapor enters the adsorber vessel it is immediately adsorbed on the adjacent activated carbon with the evolution of heat. The temperature rise of that portion of the bed actively adsorbing depends among other things upon the type of fuel and may in some cases rise well over 100° F. In the arrangement illustrated with the vapor inlet adjacent the top of the bed, the upper layer as it were of carbon first becomes warm. Since heat is evolved only when adsorption is occurring and since the carbon tends to become saturated with vapor, it is possible to determine the degree of saturation of the entire bed by observing the progress of the hot zone from the inlet to the exhaust end of the bed. Thus when the hot zone closely approaches the exhaust opening, the bed is almost saturated with vapor.

In a preferred embodiment of the apparatus, a temperature indicating device of any suitable well known type is provided adjacent the exhaust opening in the adsorber vessel so that the operator will be apprised of the condition of the adsorbent. Such devices preferably have a suitable alarm system associated therewith, such for example as a red light or bell. If desired a plurality of temperature sensing devices may be employed over the length of the vessel with an associated suitable known type of recording device to give an accurate record of the adsorbing action at successive levels in the bed. In most instances, however, a single thermometer or thermocouple 70 (Figs. 1 and 2) will suffice. The bulb or leads 71 are positioned sufficiently above or removed from the exhaust opening to indicate when only one more aircraft refueling can be accommodated by using the remainder of the unspent charge of adsorber in the vessel. When the temperature in this portion of the bed becomes elevated, the operator prepares either to bring up a fresh cart or to switch to a fresh vessel for the next succeeding aircraft.

When the vessels on one cart have become saturated, usually after two to three days in the summer or after about two weeks or more in the winter, the vessels are taken to a remote safe place and the adsorbent material is either removed for regeneration, or if the facilities are available, the adsorbent is regenerated in the vessel simply by first disconnecting the hose at 37—38 and then back feeding superheated steam through the bed to flush out adsorbed hydrocarbon material.

In accordance with the method of the present invention the portable apparatus above described is towed to a position beneath the wing tank of the aircraft as illustrated in Fig. 1, flexible hose 31 is unwound and the end 61 thereof which is provided with a suitable quick-detachable fitting for coupling with the vent opening 62 of the fuel tank, is secured to the vent. The fuel line 63 is secured to the opening 64 of the tank and fuel under pressure introduced thereto. The vapor-laden air in the fuel tank passes with the aforementioned slight resistance through hose 31, through hollow reel 32, the manifold, and ultimately through the adsorber material in vessel 17 or 18 wherein the noxious vapors are adsorbed and fresh air issues from opening 24. The noxious vapors are thus safely conducted away from the fuel tank vent, contained and rendered harmless in the immediate vicinity of the aircraft.

The present invention thus provides the simplest and most convenient apparatus for control of the aforesaid vapors. For example, a portable liquid absorber would be quite complex both as regards pumps and compressors, as would a central liquid absorption system. A central system, whether employing a liquid or a solid material, lacks the flexibility of the apparatus of the present invention, requires a very substantial investment outlay, and would suffer from high operating costs.

I claim:

1. In the refueling of aircraft with fuel, the vapors of which are explosive over a substantial range of atmospheric temperatures and pressures, the method of preventing the escape of such vapors from the fuel tank vents to the region surrounding the aircraft which comprises: bringing an enclosed portable bed of finely divided adsorbent material to a position adjacent the aircraft, introducing fuel under pressure into the aircraft tank at a rate causing pressure to be established in the vapor-laden air in the tank, collecting said vapor-laden air at the tank vent, conducting the same into the portable bed of finely divided adsorbent material wherein the vapors are adsorbed and discharging the thus stripped air from the bed, the rate of introduction of fuel to said tank being such as to establish at least sufficient pressure in the vapor-laden air therein as displaced by said fuel to force said vapor-laden air to and through said portable bed of adsorbent material.

2. Apparatus for receiving air laden with fuel vapors issuing from the vent of a fuel tank of an aircraft being refueled, and for removing the vapors from said air, consisting essentially of portable base means adapted to be placed adjacent the aircraft, a closed adsorber vessel on said base, a bed of finely divided regeneratable fuel vapor adsorbing material within the adsorber vessel, said adsorbmer vessel having an inlet opening and an exhaust opening so disposed relative to one another as to necessitate the passage of substantially all of the vapor-laden air entering said inlet through and in contact with at least a major portion of the material of said bed before reaching said exhaust opening, and exterior conduit means communicating with said inlet opening and provided with detachable connection means for connecting said conduit to the fuel tank vent.

3. Apparatus as set forth in claim 2 including temperature responsive means, positioned adjacent the exhaust opening of the closed adsorber vessel and extending into the bed of adsorbent material, for indicating a condition of elevated temperature in the bed of adsorbent material to thereby indicate when the material of said bed in advance of said temperature responsive means has become substantially saturated with fuel vapors.

References Cited in the file of this patent

UNITED STATES PATENTS

| | | |
|---|---|---|
| 1,590,266 | Tiedtke et al. | June 29, 1926 |
| 1,655,312 | Daniel | Jan. 3, 1928 |
| 2,535,902 | Dailey | Dec. 26, 1950 |
| 2,573,868 | Newell | Nov. 6, 1951 |
| 2,583,352 | Berg | Jan. 22, 1952 |
| 2,776,723 | Lester | Jan. 8, 1957 |